(12) United States Patent
Draese et al.

(10) Patent No.: US 12,179,679 B2
(45) Date of Patent: Dec. 31, 2024

(54) METHOD FOR SECURING IN PARTICULAR SAFETY-RELEVANT LOADS IN A MOTOR VEHICLE

(71) Applicant: Robert Bosch GmbH, Stuttgart (DE)

(72) Inventors: Nils Draese, Stuttgart (DE); Frederik Tekotte, Rhede (DE); Michael Muerken, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 157 days.

(21) Appl. No.: 17/996,055

(22) PCT Filed: May 27, 2021

(86) PCT No.: PCT/EP2021/064233
§ 371 (c)(1),
(2) Date: Oct. 12, 2022

(87) PCT Pub. No.: WO2022/002495
PCT Pub. Date: Jan. 6, 2022

(65) Prior Publication Data
US 2023/0202410 A1   Jun. 29, 2023

(30) Foreign Application Priority Data

Jul. 3, 2020   (DE) ................... 10 2020 208 401.7

(51) Int. Cl.
*B60R 16/03*   (2006.01)
*B60R 16/023*   (2006.01)
*H02H 3/08*   (2006.01)

(52) U.S. Cl.
CPC .......... *B60R 16/03* (2013.01); *B60R 16/0238* (2013.01); *H02H 3/08* (2013.01)

(58) Field of Classification Search
CPC ...... B60R 16/03; B60R 16/0238; H02H 3/08; H02H 3/093
See application file for complete search history.

(56) References Cited

U.S. PATENT DOCUMENTS 11,070,045 B1 * 7/2021 Li ........................... H02H 3/207
2005/0190515 A1   9/2005 Hallak et al.
(Continued)

FOREIGN PATENT DOCUMENTS

CH              447308 A    11/1967
DE      102005004330 A1     8/2006
(Continued)

OTHER PUBLICATIONS

International Search Report for PCT/EP2021/064233, Issued Aug. 20, 2021.

*Primary Examiner* — Scott Bauer
(74) *Attorney, Agent, or Firm* — NORTON ROSE FULBRIGHT US LLP; Gerard A. Messina

(57) ABSTRACT

A method for securing safety-relevant loads in a motor vehicle, including a main path arranged between a sub-on-board electrical system for a safety-relevant load of a motor vehicle and another sub-on-board electrical system for a non-safety-relevant load. The sub-on-board electrical system for the safety-relevant load is supplied with power by an energy store. The main path includes at least one switch, and at least one detector for detecting a current flowing through the main path. At least one additional path is provided which is connected in parallel with the main path, the additional path having at least one switch. The method includes: opening the main path upon detection of a critical state, i.e., an overcurrent and/or an undervoltage or overvoltage on the sub-on-board electrical system for the safety-relevant load.

(Continued)

The additional path is closed or kept closed while the main path is open. The additional path is subsequently reopened.

19 Claims, 5 Drawing Sheets

(56) References Cited

U.S. PATENT DOCUMENTS

| | | | |
|---|---|---|---|
| 2008/0151454 A1* | 6/2008 | Uhl | B60R 21/017 |
| | | | 361/87 |
| 2013/0257537 A1* | 10/2013 | Mourant | H03F 1/34 |
| | | | 330/260 |
| 2016/0322809 A1 | 11/2016 | Wang | |
| 2021/0066013 A1* | 3/2021 | Kumar | H01H 9/548 |

FOREIGN PATENT DOCUMENTS

| | | |
|---|---|---|
| DE | 202009004198 U1 | 8/2010 |
| DE | 102015222544 A1 | 5/2017 |
| DE | 102018201119 A1 | 7/2019 |
| DE | 102018202987 A1 | 8/2019 |
| DE | 102018212507 A1 | 1/2020 |
| EP | 3101678 B1 | 9/2017 |
| EP | 3611056 A1 | 2/2020 |
| WO | 03105330 A2 | 12/2003 |
| WO | 2010108565 A1 | 9/2010 |
| WO | 2013167310 A1 | 11/2013 |
| WO | 2020007403 A1 | 1/2020 |

\* cited by examiner

METHOD FOR SECURING IN PARTICULAR SAFETY-RELEVANT LOADS IN A MOTOR VEHICLE

FIELD

The present invention relates to a method for securing in particular safety-relevant loads in a motor vehicle.

BACKGROUND INFORMATION

A battery connection for an on-board electrical system is in German Patent Application No. DE 10 2018 202 987. This battery connection comprises an electronically controlled on-board electrical system coupling-isolation functionality for implementing an electronically controlled current distribution, the battery connection comprising a number of switching elements, of which at least some are connected to one another in a star-like manner.

German Patent Application No. DE 10 2018 212 507 A1 describes an electronic power distributor for an on-board energy system, comprising at least one first connection for safety-critical loads and at least one second connection for a branch in which at least one load is arranged. The power distributor further comprises an electronic fuse which, in a closed state, allows a current flow to the at least one second connection and, in an open state, interrupts this current flow, wherein a bypass to the electronic fuse is provided, which, in an operating state in which the electronic fuse is open, allows the current flow to the at least one second connection.

An object of the present invention includes providing a device which reliably conducts and can disconnect high currents, in particular in the case of on-board electrical systems with high safety requirements, such as in conjunction with automated driving functions. This object may achieved by the features of the present invention.

SUMMARY

According to an example embodiment of the present invention, due to the following steps, namely opening the main path upon detection of a critical state, in particular an overcurrent and/or an undervoltage or overvoltage on the sub-on-board electrical system for the safety-relevant load, the additional path being closed or kept closed while the main path is open and the additional path being subsequently reopened, a reliable isolation of the sub-on-board electrical systems is achieved. In addition, high current capability can be achieved, as is advantageous for the targeted melting of fuses for obtaining the availability of the vehicle. By providing the additional path, current limitation functions and terminating functions can be realized, by means of which a disconnection of high currents is possible even in the case of inductive load. A robust design is thus possible, so that in particular safety-critical power semiconductors are not loaded with excessively high energy. In addition, the stepped disconnection leads to the prevention of oscillations.

In an expedient development of the present invention, it is provided that the additional path is reopened after a predeterminable period of time, in particular in a range of from 0.1 ms to 10 ms. This enables simple implementation, which can also be tested particularly easily. In addition, the switching means (i.e., switch) in the additional path is therefore not exposed to excessively high loads.

In an expedient development of the present invention, a timer is started with the opening of the main path, while the additional path is closed or kept closed and the additional path is opened when the timer has elapsed. The implementation with a timer is particularly simple and can also be checked for proper functioning without load, for example.

In an expedient development, it is provided that the additional path is used for current limitation and/or for absorbing energy during the switching process of the main path, in particular by means of at least one resistor arranged in the additional path, particularly preferably a metal resistor. Due to the corresponding current limitation in the additional path, the switching elements of the main path are not exposed to an excessively high energy load in the event of a fault. This increases the safety of the arrangement. Metal resistors in particular, for example made of metal alloys, are distinguished by high energy absorption.

In an expedient development of the present invention, it is provided that a voltage limitation, in particular a diode, particularly preferably a TVS diode, is activated or remains activated while the main path and/or additional path is open. A targeted voltage limitation which limits the current independently of a voltage drop across the switching element is thus achieved. This prevents operation in avalanche mode during the switching processes of the switching means of the main path in the case of MOSFETs, for example. The safety of the arrangement is further increased.

In an expedient development of the present invention, it is provided that the additional path remains closed until the current through the switching means has subsided exponentially and/or has subsided to a certain threshold value. Thus, energy can quickly be dissipated, but it can also be ensured that after a certain decay behavior or after a threshold value is reached, a deactivation of the additional path takes place so that associated switching means are not exposed to critical loads.

In an expedient development of the present invention, it is provided that, when a critical state is detected, a countermeasure, in particular a safe stopping of the motor vehicle, is initiated and/or the main path is closed or is kept closed until a fuse that secures the non-safety-relevant load has burned through. It is thus possible to reliably prevent the motor vehicle from breaking down, so that a towing of the vehicle for repair purposes can be prevented, for example.

In an expedient development of the present invention, it is provided that a closing of the main path for the burning-through of a fuse that secures the non-safety-relevant load takes place during the driving operation of the motor vehicle, if no critical state has been detected. Thus, the running operation is not impaired and the process therefore is not noticed by the driver.

In an expedient development of the present invention, it is provided that the undervoltage criterion is deactivated and/or an overcurrent threshold and/or thermal monitoring is activated or remains activated. This makes it possible to burn through the fuse. On the other hand, dangerous states are prevented for the switching means. This is possible in particular in that the main path and/or the additional path is closed after deactivation of the undervoltage criterion.

In an expedient development of the present invention, it is provided that, after the fuse has been burned through, the undervoltage criterion is reactivated again. This again results in complete monitoring of the sub-on-board electrical system for safety-relevant loads. Particularly preferably, continued travel is subsequently enabled.

In an expedient development of the present invention, it is provided that the additional path for charging an intermediate circuit capacitor is closed, in particular during the initial start-up of the motor vehicle, and/or after the charging of the intermediate circuit capacitor, in particular after a certain period of time, the main path is closed. In this way, particularly during the initial start-up, the current flow remains at a level which is generally non-critical for the switching means.

In an expedient development of the present invention, it is provided that an evaluation of a direction of the current flowing between the two sub-on-board electrical systems is carried out and/or the main path is only opened in a critical state, in particular an undervoltage, when a current from the sub-on-board electrical system having the safety-relevant load flows into the further sub-on-board electrical system having the non-safety-relevant load. This ensures that, in particular in the case of an undervoltage, the voltage level in the sub-on-board electrical system having the safety-relevant load is not further reduced.

In an expedient development of the present invention, it is provided that at least one capacitor and at least one resistor are connected in parallel at least to the switching means as a commutation aid for the relevant switching means. Short-term power peaks can be stored via these RC elements, as a result of which fast commutation is supported.

Further expedient developments of the present invention can be found in the disclosure herein.

DETAILED DESCRIPTION OF EXAMPLE EMBODIMENTS

The present invention is illustrated schematically on the basis of an exemplary embodiment and will be described in detail below with reference to the figures.

Figure 1:
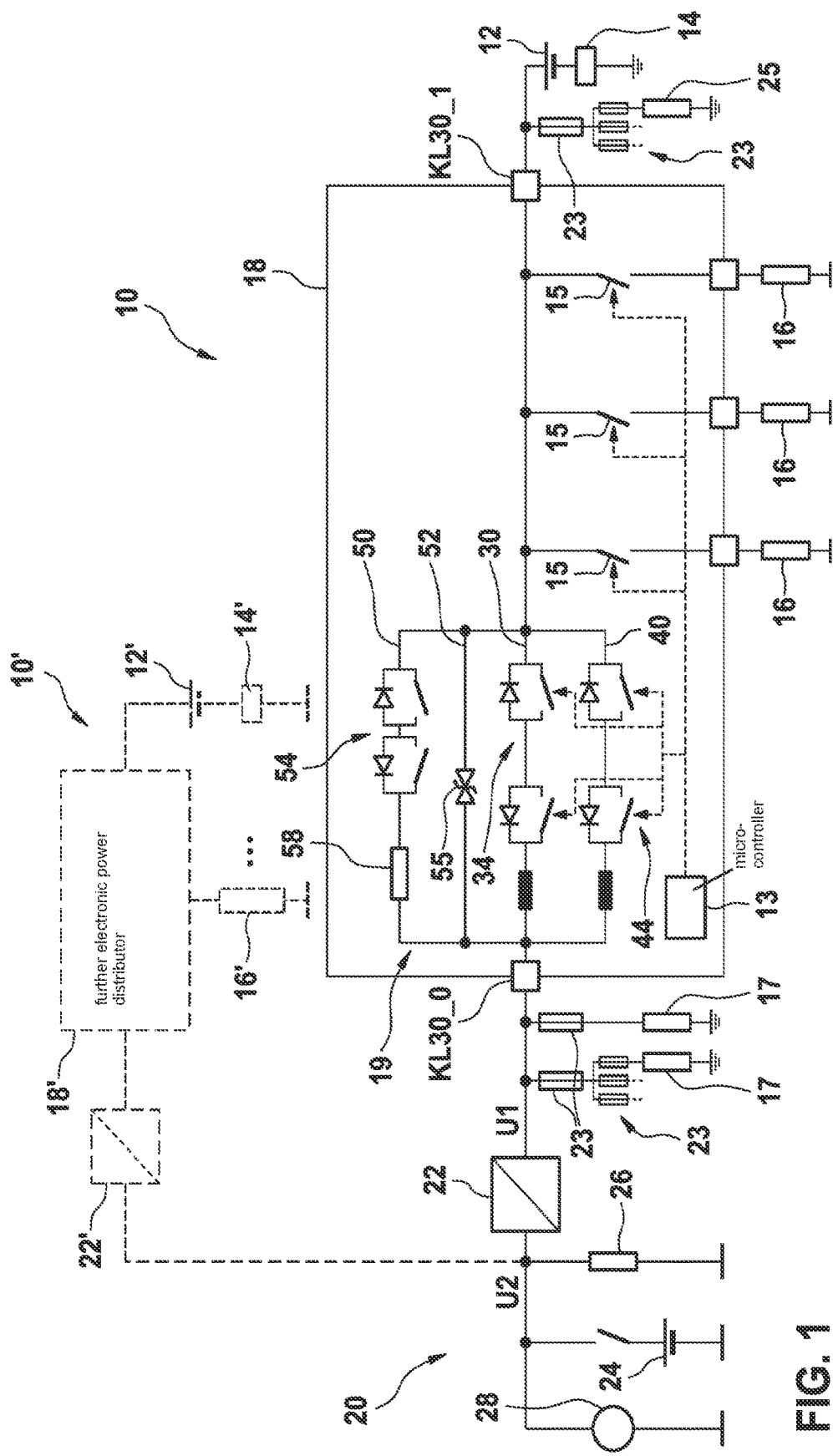
FIG. 1 shows an on-board electrical system in which the switching means is implemented, according to an example embodiment of the present invention.

FIG. 1 shows a possible topology of an energy supply system, consisting of an on-board electrical system 10 which comprises an energy store 12, in particular a battery 12 with an associated sensor 14, preferably a battery sensor, and a plurality of in particular safety-relevant loads 16 which are secured or controlled by an electrical power distributor 18. The loads 16 are special loads having high demands or a high protection requirement, generally referred to as safety-relevant loads 16. For example, in this case an electrical steering system and/or a brake system are components which must be supplied with power in order to ensure steering and/or braking of the vehicle in the event of a fault. For this purpose, corresponding characteristic variables of the load 16 in question are detected separately and, in the event of a deviation from tolerable values, the corresponding switch 15 is opened to protect the load 16 in question.

The energy store 12 is likewise connected to a connection (terminal KL30_1) of the power distributor 18. The sensor 14 is able to detect an electrical characteristic variable, for example a voltage Ub, at the energy store 12 and/or a current Ib through the energy store 12 and/or a temperature Tb of the energy store 12. The sensor 14 can determine, for example, the state of charge SOC of the energy store 12 or further characteristic variables of the energy store 12 from the determined electrical characteristic variables Ub, Ib, Tb. An additional supply branch for at least one further load 25 is optionally also provided at the further connection (KL30_1) of the power distributor 18 to which the energy store 12 is also connected. The load 25 is secured via a fuse 23. Further loads 25 can also be provided, which can also be secured via fuses 23. These loads 25 are loads which are still to be supplied with energy by the energy store 12 even when the switching means (i.e., switch) 19 is disconnected or opened in the power distributor 18, that is to say, preferably safety-critical loads 25 or loads 25 which are critical in view of the generation of disturbances with respect to power supply reliability. An (optional) safety-relevant or safety-critical on-board electrical system path is thus connected to the connection KL30_1.

The power distributor 18 is able to determine corresponding characteristic variables such as voltage Uv and current Iv of the loads 16. In addition, the power distributor 18 is also able to determine corresponding characteristic variables of the energy store 12 such as voltage Ub and/or current Ib and/or temperature Tb. For this purpose, the power distributor 18 contains the corresponding sensors. Likewise, the power distributor 18 has corresponding processing means, such as a microcontroller 13, to store and/or evaluate detected variables. The microcontroller 13 is additionally able to control corresponding switches 15 or switching means (i.e., switches) 34, 36, 44, 46, 54 of the switching means (i.e., switch) 19 (high-current circuit breaker). Alternatively, the evaluation could also take place in another control unit.

Furthermore, the power distributor 18 is able to supply signals, depending on the state of the energy store 12, on the basis of which signals the transition into a safe state is initiated. For example, a superordinate control unit then initiates a safe stopping of the vehicle (approach of the next parking space, immediate stopping on the shoulder, etc.) and leaves the autonomous driving mode.

Likewise, the power distributor 18 has corresponding processing means, such as the microcontroller 13, to store and/or evaluate detected variables. In addition, the power distributor 18 can comprise an application-specific circuit (ASIC), by means of which a safety function is realized in conjunction with the correspondingly controlled switches 15 for the in particular safety-relevant loads 16 connected to the outputs. In the case of certain critical states (for example exceeding a specific temperature, power loss, overcurrent, overvoltage, undervoltage, etc.), the switch 15 and/or switching means 19 is opened in order to thus prevent, for example, an overload situation. The power distributor 18 can be provided with a connection for a communication system, in particular a bus system such as a CAN bus and/or LIN bus. In addition, a connection for at least one further connection signal, for example the so-called terminal 31 signal (ignition on), can be provided. As can be seen, the associated energy store 12 is connected to a connection of the power distributor 18. However, this does not have to be provided as a direct connection, but could, if appropriate, be implemented with the interposition of further components, such as conventional fuse boxes or the like.

In addition, the switching means 19 is provided, which is located between the connection (KL30_0) of the power distributor 18 and the further connection (KL30_1) for the energy store 12. If necessary, the loads 16 connected to the outputs of the power distributor 18 could be supplied with power via the switching means 19 by another energy source, for example by another on-board electrical system branch via a DC-to-DC converter 22, if the energy store 12 connected to the other terminal KL30_1 were to fail. A corresponding isolating or coupling function, in particular of the two on-board electrical system branches (sub-on-board electrical system for non-safety-relevant loads 17 at connection KL30_0; further sub-on-board electrical system for safety-relevant loads 16, 25) can be realized via the switching means 19. This function is used in particular as a safety function in order to prevent the effects of critical states such as overvoltages or undervoltages and/or overcurrents and/or thermal overloading. In the event of a fault, the two sub-on-board electrical systems can be isolated from one another by the switching means 19. The safety-relevant loads 16, 25 of the safety-relevant sub-on-board electrical system are thus isolated from the non-safety-relevant loads 17 of the other sub-on-board electrical system.

The safety-relevant loads 16, 25 supplied by the power distributor 18 could, for example, comprise safety-relevant vehicle functions such as braking, steering, etc., in particular loads 16 with high demands in respect of protection requirements. In general, safety-relevant loads 16, 25 are loads particularly worthy of protection which are necessary, for example, to maintain certain emergency functions. In addition to the described functions such as steering and braking, the functions can also be those which, for example after an accident, should still be functional, such as restraint systems, closing systems for opening and closing the vehicle doors, emergency call systems, for example for sending an electronic emergency call, sliding roof functions, lighting, windshield wipers or the like.

The basic on-board electrical system 10 has a lower voltage level U1 compared to a high-voltage on-board electrical system 20, for example it can be a 14 V on-board electrical system. A DC-DC converter 22 is arranged between the basic on-board electrical system 10 and the high-voltage on-board electrical system 20. The high-voltage on-board network 20 comprises, by way of example, an energy store 24, for example a high-voltage battery, possibly with an integrated battery management system, shown by way of example as a load 26, for example a comfort load such as an air-conditioning system which is supplied with an increased voltage level, etc., and an electric machine 28. In this context, a high voltage is understood to mean a voltage level U2 which is higher than the voltage level U1 of the on-board electrical system 10. For example, it could be a 48-volt on-board electrical system. Alternatively, the voltage levels could be even higher, particularly in vehicles with electric drive. Alternatively, the high-voltage on-board electrical system 20 could be omitted entirely.

A further branch or a further sub-on-board electrical system for supplying power to further loads 17 is arranged between the connection (KL30_0) of the power distributor 18 and the DC-DC converter 22. The respective loads 17 are secured by means of corresponding fuses 23, as shown by way of example. These loads 17 are typically comfort loads or non-safety-relevant loads.

Comfort loads 17 and fuses 23 can be divided and thus grouped into main groups and sub-groups depending on the applications. These are those loads 17 which are not distinguished by high safety relevance (such as the loads 25) or by high demands in respect of a protection requirement (such as the loads 16). The effects of these loads 17 on safety-relevant loads 25 or 16 can be prevented by isolation of the fault by opening the switching means 19. The switching means 19 is therefore arranged between the loads 17 and the safety-relevant loads 25 and/or the loads 16 with a high protection requirement.

By means of the on-board high-voltage electrical system 20, at least one or more, in particular safety-relevant, channels or on-board electrical system branches 10' can be connected via a further DC-DC converter 22'. The safety-relevant channels could each have a further electronic power distributor 18'. Optionally, the further power distributor 18' can also be connected directly to the same connection KL30_0 as the power distributor 18 without further DC-DC converters 22'. The further electronic power distributor 18' could be used for securing, control and also for the safe and reliable disconnection of safety-relevant loads 16' or of the electronic energy network distribution. These loads 16' could be designed to be functionally redundant to such loads 16, which are supplied with power by another safety-relevant branch of the on-board electrical system 10. In addition, the further electronic power distributor 18' can be able to detect the flowing load currents or applied voltages. This briefly described optional embodiment could be provided for a highly available design, for example for autonomous driving, in order to increase safety. A further energy store 12' having a further sensor 14' could also be provided in the further on-board electrical system branch.

The high-current switching means 19 or the high-current circuit breaker is arranged in the power distributor 18 between connection (KL30_1) and connection (KL30_0) or a connection for the load 16 of the power distributor 18. The switching means 19 is able to open in the event of overcurrent and/or in the case of an undervoltage or similar critical vehicle electrical system states. The switching means 19 comprises, by way of example, at least two main paths 30, 40 connected in parallel, wherein switching means 34, 44 are provided in each main path. However, merely a single main path 30, 40 is sufficient for the switching behavior of the switching means 19 described below.

Particularly preferably, the switching means 34, 44 are formed in each case by at least two switching elements 34.1, 34.2; 44.1, 44.2 connected anti-serially (in series with one another, but oppositely directed, for example "back-to-back" or with a common source connection), preferably using power semiconductors, particularly preferably FETs or MOSFETs. Instead of MOSFETs, relays, bipolar transistors or IGBTs with parallel diodes etc. can also be used, for example. The respective main paths 30, 40 with associated switching means 34, 44 are particularly preferably constructed symmetrically, so that the same currents flow through the two main paths 30, 40 during correct operation.

An additional path 50 is connected in parallel with the main paths 30, 40. The additional path also has a switching means 54 and a series resistor 58 as a current limitation or "braking resistor". The switching means 54 consists of at least two anti-serially connected switching elements 54.1, 54.2. The additional path 50 has the capability of isolating the current flow under high currents (for example greater than 900 A) even under inductive load 57. Furthermore, a detection means (i.e., a detector) is also provided in the additional path 50 in order to carry out a current measurement. For example, the resistor (RDSon) between the drain and the source is monitored at a MOSFET in the connected state.

Optionally, a further sub-path 52 can be connected in parallel with the additional path 50. In the further sub-path 52 there is at least one voltage limitation 55, for example a specific diode such as preferably a TVS diode.

By way of example, a battery or accumulator is described as a possible energy store 12, 24 in the exemplary embodiment. Alternatively, however, other energy stores suitable for this task can likewise be used, for example on an inductive or capacitive basis, fuel cells, capacitors or the like.

Figure 2:
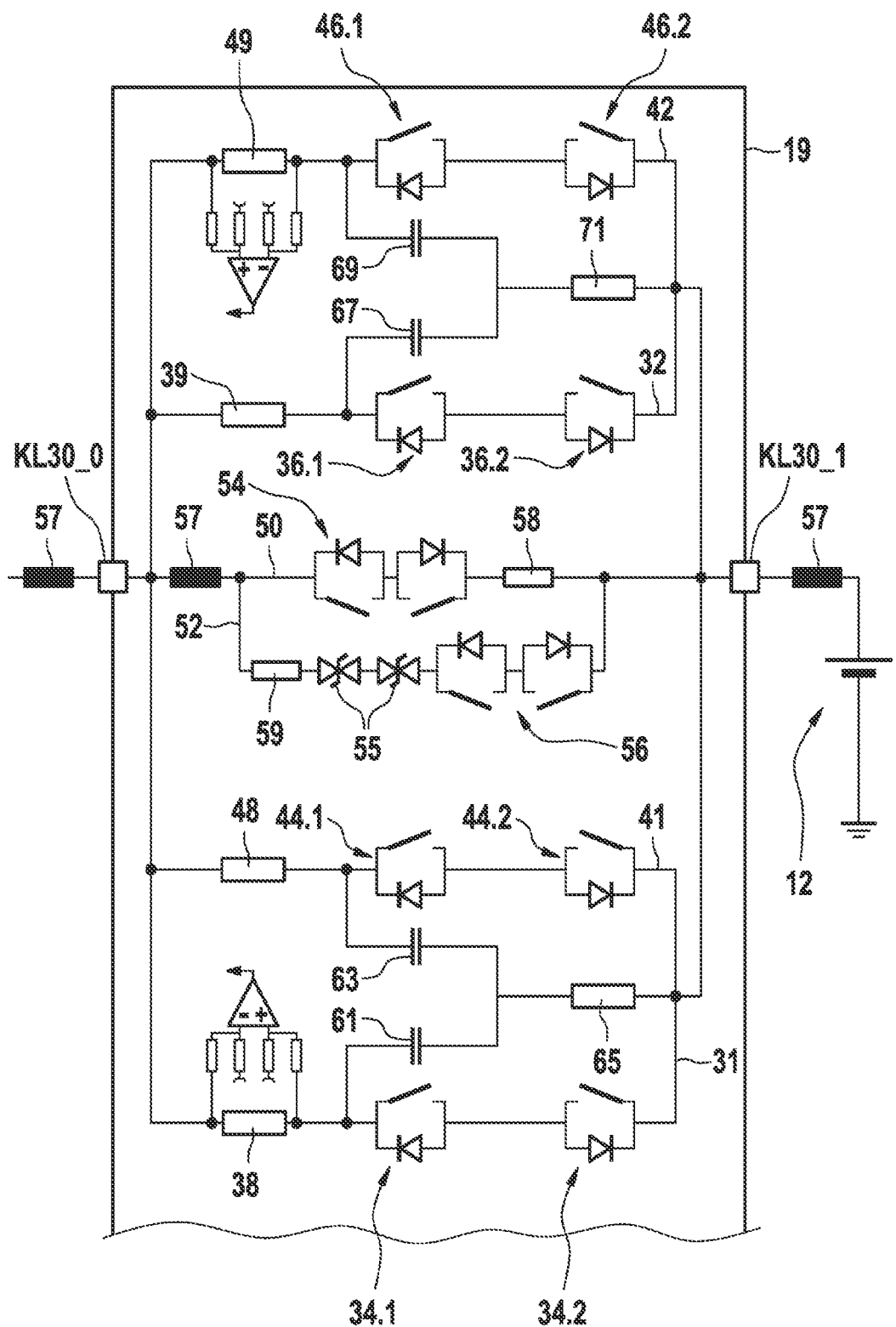
FIG. 2 shows the more precise construction of the switching means, according to an example embodiment of the present invention.

In the exemplary embodiment according to FIG. 2, the construction of the switching means 19 is shown in more detail. Thus, the main path 30 comprises two sub-paths 31, 32, which are connected in parallel with one another. In one sub-path 31, the two anti-serially connected switching elements 34.1, 34.2 and a detection means (i.e., detector) 38 for a current flowing through the sub-path 31 are arranged therein. The detection means 38 is formed as a resistor, for example. A corresponding current detection circuit for detecting the current flowing through the detection means 38 is indicated. In the further sub-path 32, the two anti-serially connected further switching elements 36.1, 36.2 and a further detection means 39 for a current flowing through the further sub-path 32 are arranged therein. The detection means 39 is, for example, formed as a resistor and connected in series to the switching elements 36.1 and 36.2. Instead of a resistor, it is also possible to use other detection means, such as magnetic field sensors or, for example, to evaluate the voltage drop across one or more switching elements.

Thus, the further main path 40 also comprises two sub-paths 41, 42 which are connected in parallel with one another. In one sub-path 41, the two anti-serially connected switching elements 44.1, 44.2 and a detection means 48 for a current flowing through the sub-path 41 are arranged therein. The detection means 48 is formed as a resistor, for example. In the further sub-path 42 (of the further main path 40), the two anti-serially connected further switching elements 46.1, 46.2 and a further detection means 49 for a current flowing through the further sub-path 42 are arranged therein. The detection means 49 is formed as a resistor, for example. A corresponding current detection circuit for detecting the current flowing through the detection means 48 is indicated.

The detection means 38, 39, 48, 49 could in each case forward the currents flowing through the associated sub-paths 31, 32, 41, 42, for example to the microcontroller 13. Or the current flow in the sub-paths 31, 32; 41, 42 could be determined by averaging two detection means 38, 39; 48, 49 of the relevant main path 30, 40 in each case.

The switching means 34, 36; 44, 46 and the associated detection means 38, 39; 48, 49 are particularly preferably designed symmetrically, that is to say they are formed with the same resistance values or characteristic variables, etc. Thus, in fault-free operation, an identical current flow should result in each case in the various sub-paths 31, 32; 41, 42. In the case of deviations of the symmetry, this indicates a fault to be evaluated.

Furthermore, the respective sub-paths 31, 32; 41, 42 are ideally arranged in an interleaved manner with respect to one another in each case. In the circuit layout, the corresponding sub-branches 31, 41; 32, 42 can be arranged such that, for example, two sub-paths 31, 32; 41, 42 of a main path 30; 40 enclose a sub-path 41 1; 32 of the corresponding further main path 40; 30 or that the respective sub-paths 31, 41, 32, 42 are arranged alternately with respect to the main path 30, 40. Particularly preferably, the additional path 50 and/or the sub-path 52 are arranged in the center in each case surrounded by two sub-paths 31, 41 1; 32, 42 of different main paths 30, 40.

In addition to the optimized placement on the circuit carrier, the high-current switching processes can be assisted by switching load relief networks. The switching load relief networks are likewise arranged in an interleaved manner close to the switching means 34, 44 and 36, 46. The switching load relief networks are constructed from the capacitors 69, 67 and the resistor 71, as well as 63, 61 and resistor 65. In this case, not only is the oscillation tendency damped by means of the resistors, but switching energy is absorbed by the highest possible resistance value, and the commutation process is accelerated by the high resistive voltage drop. By placing the switching load relief between the sub-paths, each switching load relief can absorb disconnection energy both from main path 30 and from main path 40. The embodiment shown in FIG. 2 represents the special case in which a common resistor 71 is provided for two capacitors 69, 67 (or 65 for capacitors 61 and 63).

An optional sub-path 52 is provided to the additional branch 50, in which the switching means 54 (again anti-serially connected switching elements 54.1, 54.2) are arranged and the series resistor 58 is arranged so as to be connected in series. The optional sub-path 52 is connected in parallel with the additional branch 50. In the optional additional branch 52, a switching means 56 (consisting of two anti-serially connected switching elements 56.1, 56.2) and at least one voltage limitation 55, preferably two voltage limitations 55 (in particular a diode, particularly preferably a TVS diode for preventing avalanche control of the switching elements in the main paths 30, 40), and optionally a detection means 59, in particular a resistor for detecting the current and for current limitation through the sub-path 52, are connected in series. An inductor 57, as an example of a line inductor, is shown between the common potential of additional path 50 and optional sub-path 52 and the connection (terminal KL30_0) of the power distributor 18.

The described device relates to a high-current circuit breaker concept (switching means 19) for motor vehicle low-voltage on-board electrical systems<100 V. In the context of the progressive electrification of safety-relevant vehicle components, the availability of the on-board electrical system 10 is becoming increasingly important. In this context, switches are introduced in order to control and secure the energy flows and functional availability in the on-board electrical system 10. ISO 26262 places extensive demands on the functional safety of these components and the overall on-board energy system.

For the complete isolation of the current flow between connection KL30_1 or the safety-relevant sub-on-board electrical system and connection KL30_0 or the non-safety-relevant sub-on-board electrical system, six anti-serial MOSFET paths (sub-paths 31, 32, 41, 42, 50, 52) are used in the example. Four (sub-paths 31, 32, 41, 42) are closed in normal operation and represent a low-resistance (<2 mΩ) connection between connection KL30_1 or the safety-relevant sub-on-board electrical system and connection KL30_0 or the non-safety-relevant sub-on-board electrical system. Another current path, the additional path 50, is equipped with the additional series resistor 58. Via this series resistor, the current flow can be conducted and limited (by the resistor 58) in a parking mode (idle operation of the vehicle). As a result of this limitation, a natural protection against an uncontrolled current increase is provided in the parking mode. As a result, a complex protective circuit and diagnosis can be dispensed with in the parking mode. In addition, the series resistor 58 is used as a "braking resistor". In the event that a very high current flow with a high line inductor 57 has to be disconnected by the switch 19, a stepped disconnection is possible via the current-limited additional path 50.

The optional further sub-path 52 of the additional path 50 can be equipped with a voltage limitation (for example by TVS diodes) 55 in order to prevent operation of the switching means 34, 44, 36, 46 (in particular MOSFETs) in avalanche mode.

The paths are divided into two main paths 30, 40: main path 30 with the sub-paths 31, 32 (which are connected in parallel), and main path 40 with the sub-paths 41, 42. The two main paths 30, 40 have a separate independent current measurement or current detection (detection means 38, 39; 48, 49) which detect the current flow in each main path 30, 40. The detected current is compared with a predeterminable threshold value G. If the detected current exceeds a permissible threshold value G (for example 250 A in a sub-path 31, 32, 41, 42), a fault is inferred and corresponding countermeasures are initiated, such as the opening of the switching means 34, 36, 44, 46. The main paths 30, 40 preferably each have threshold value comparators which operate independently of one another and/or controllers for the relevant switching means 34, 36, 44, 46.

By means of a symmetrical structure and the use of low-resistance (for example less than 2 mΩ) switching means 34, 44, a quite uniform division of the total current I over the two main paths 30, 40 occurs during normal operation. An increasing asymmetry of the two current measurement signals in the two main paths 30, 40 is an indicator of an error in the current measurement or the detection means 38, 39, 48, 49, of the control (not shown specifically) of the switching means 34, 36, 44, 46 (for example in the case of MOSFET drops of the gate-source voltage), or the switch means 34, 44 itself (for example die attach in the case of MOSFETs, etc.).

To limit an error, the main paths 30, 40 can be disconnected individually in order to conduct the entire current flow through a single main path 30, 40. As a result, a plausibility check of the two current measurement signals relative to one another or to their sum is possible. A targeted disconnection of one of the main paths 30, 40 could be realized, for example, by a brief reduction of the threshold value, which leads to a disconnection, below a value of the currently flowing current in this main path 30, 40. If the increased current value (increase of the current value after disconnection in the main path 30 with respect to the current value in the main path 30 before disconnection) in the one main path 30 after the other main path 40 has been disconnected deviates significantly from the current value determined for the other main path 40 prior to disconnection, a fault of the detection means 48, 49 is inferred. Accordingly, the detection means 38, 39 and 48, 49 can also be checked by disconnecting the main path 30 with corresponding detection of the current before and after disconnection in the further main path 40.

By means of the current measurement (by detection means 38, 39; 48, 49) in two independent main paths 30, 40 and their diagnosis, it is possible to operate the two main paths 30, 40 redundantly with respect to one another. In this case, each main path 30, 40 receives its own overcurrent disconnection (disconnection as soon as a critical threshold value or state is reached) and a separate gate driver including the power supply.

This overcurrent disconnection can optionally also be tested during operation in order to detect latent errors in the overcurrent disconnection, the control, or the switching means 34, 44. For this purpose, the overcurrent disconnection of a main path 30, 40 can be triggered by reducing the threshold value (for example from 250 A to 75 A or depending on what current is currently flowing). The switching means 34, 44 must subsequently be opened and the common current flow must switch from the two main paths 30, 40 into the remaining closed main path 30 or 40.

The described operational management for testing ensures that
- the current measurement or detection means 38, 39, 48, 49 functions,
- the current value is compared correctly with a threshold value.
- the exceeding of the threshold value triggers a disconnection (opening of switching means 34, 36, 44, 46).
- the disconnection actually opens the switching means 34, 36, 44, 46.

In addition, it is possible to draw the center potential between the anti-serially connected switching elements 34.1, 34.2; 44.1, 44.2, for example into the negative range, in order to check whether the two switching elements 34.1; 34.2; 44.1.44.2 can block a defined voltage.

The extensive diagnosis makes it possible to guarantee high safety requirements (for example ASIL C) with regard to the isolatability of the switching means 19.

As a result of the likewise redundant control of the two main paths 30, 40, it is also possible to guarantee high safety requirements (for example ASIL C) for the conductivity of at least one main path 30, 40. In the event of a fault, it is possible to maintain a reduced operation with only a single main path 30, 40. For this purpose, the main paths 30, 40 are ideally interleaved with one another in order to prevent the formation of local power peaks.

The additional path 50 is provided in parallel with the low-resistance main path 30, 40 and is formed with the series resistor 58. The maximum current level which can flow through the resistor 58 in a 12 V on-board electrical system, for example, can be limited to non-critical values via the series resistor 58 (for example 40 mΩ). By means of this additional path 50, a "high-resistance" connection between connection KL30_1 and connection KL30_0 can thus also be achieved, in particular in the parking mode (idle operation of the vehicle, vehicle is parked).

The detection of the current flow via the additional path 50, in particular in the parking mode, can be used as a wake-up signal for the control unit. During wake-up, the cause of the current increase can be evaluated and, in the case of a fault current, a complete isolation of the two networks (for example isolation of the sub-on-board electrical system having the energy store 12 from the further sub-on-board electrical systems 10 and 10') can be performed. In the case of a warranted wake-up from the parking mode, connection KL30_1 or the safety-relevant sub-on-board electrical system and connection KL30_0 or the non-safety-relevant sub-on-board electrical system are connected with low resistance and a change is made to active operation.

For initial pre-charging of capacitive on-board electrical system branches, a resistive pre-charge functionality can be realized via the additional path 50.

In order to be able, in the event of a short circuit, to isolate the terminal KL30_1 or the safety-relevant sub-on-board electrical system (with the safety-relevant loads 16, 25) and the terminal KL30_0 or the non-safety-relevant sub-on-board electrical system (with the non-safety-relevant loads 17) under high current load, the inductive load must be terminated by the isolation process. As a robust approach to reduce the current level in the event of the isolation of a short circuit to non-critical values, the additional path 50 with the series resistor 58 is also used for constricting the current. For this purpose, only the low-resistance main switch 34, 36, 44,

46 is first opened during an overcurrent disconnection. The energy which is stored in the line inductor 57 is subsequently reduced to a non-critical level via the RL element consisting of the line 57 and the series resistor 58. Only subsequently is the additional path 50 (the path with the series resistor 58) also opened to finally interrupt the current flow.

In order to support the commutation of the current from the main path 30, 40 to the high-resistance additional path 50, additional RC elements (snubbers) can support the commutation process. These RC elements are formed by capacitors 61, 63, 67, 69 and associated resistors 65, 71.

Since the terminating function of the additional path 50 having the series resistor 58 is necessary for maintaining the functional safety targets, its availability must be ensured via a diagnosis. It is possible to monitor the proportional current flow through the additional path 50 during operation. Another possibility is to check the conductivity of the additional path 50 via a test current which is impressed between the anti-serial switching elements 54.1, 54.2 of the additional path 50.

The described automotive main switch concept or switching means 19 for safety-critical high current applications is also particularly suitable, as described below, for the targeted triggering of fuses 23 while maintaining certain safety requirements. Under suitable on-board electrical system boundary conditions, almost all fuses 23 can be triggered directly during driving operation. The power distributor 18 ensures that the voltage limits are not violated, in order to guarantee the availability of safety-relevant loads. However, no burning-through of the fuses 23 occurs while traveling for example in the case of the following scenarios. For example, a high-current load such as a radiator fan could exceed the present current limit (for example 900 A) due to a direct short circuit. The fan is thus connected with such a low resistance that the short-circuit current in the case of a high on-board electrical system voltage (while the generator/active DC-DC converter 22 is running during travel) exceeds 900-1000 A. In this case, the switching means 19, the high-current switch, is opened for self-protection. A further critical scenario could consist in that, for example, a low resistance short circuit directly at the main distributor leads to such high currents that certain voltage limits are violated by the voltage drop. Although this short circuit would be of such high resistance that the 900 A threshold is not exceeded, it would be of such low resistance, however, that the switching means 19 or the circuit breaker detects a safety-critical voltage drop. Critical safety-relevant loads 16 such as steering and brakes could no longer be reliably supplied with power with this undervoltage. In order to ensure the power supply of safety-critical loads 16 such as brakes and steering, the switching means 19 is opened. The vehicle rolls to a stop with full steering/brake assistance (the engine control, as part of the load 17 connected to connection KL30_0, can no longer be supplied with power in this on-board electrical system branch due to the short circuit). All fuses 23 offer the potential to be triggered when the vehicle is at a standstill in the event of a terminal change. It is thus possible to prevent breakdowns, since the vehicle can be restarted at a standstill after the function "burn through fuse". In the case of the described cooling fan, a lower battery voltage at standstill leads to a reduced short-circuit current. In the case of the described main distributor short circuit, the voltage limits can be deactivated, since the vehicle is at a standstill. This is achieved by enabling the power distributor 18 in a controlled manner to trigger fuses 23, for example having currents greater than 400 A.

FIG. 3 describes the first start-up of the vehicle or the isolation of the sub-on-board electrical systems in the event of a critical state. The operating current flowing through the load 17 is indicated by dashed lines in FIG. 3A. First, a current flow 60 is introduced only through the additional path 50. For this purpose, the switching means 34, 36, 44, 46 of the main paths 30, 40 are opened. The activation of the additional path 50 causes a pre-charge of the intermediate circuit capacitor 11. Especially during the initial start-up of the vehicle, charging of the empty intermediate circuit capacitors 11 would possibly lead to excessively high currents in the main paths 30, 40. This is counteracted, as described, by the charging of the intermediate circuit capacitor 11 via the additional path 50. At the time of activation of the additional path 50, the current briefly rises somewhat in order subsequently to decrease again slightly. The voltage at the additional path 50 decreases abruptly during the activation in order to initially increase more strongly in the course of the charging of the intermediate circuit capacitor 11 and gradually decrease again in the further course.

Figure 3A:
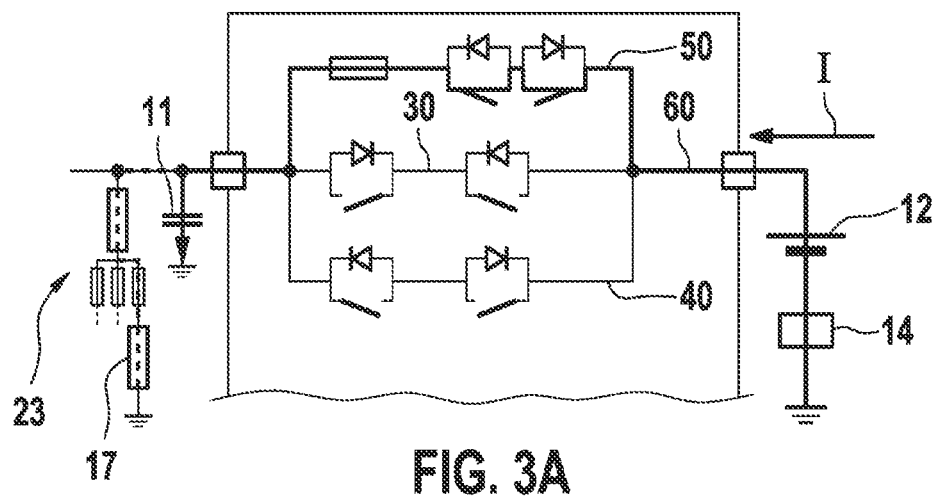
FIG. 3 shows the different activation steps during the fault-free start-up or during the isolation of the sub-on-board electrical systems, according to an example embodiment of the present invention.
Figure 3B:
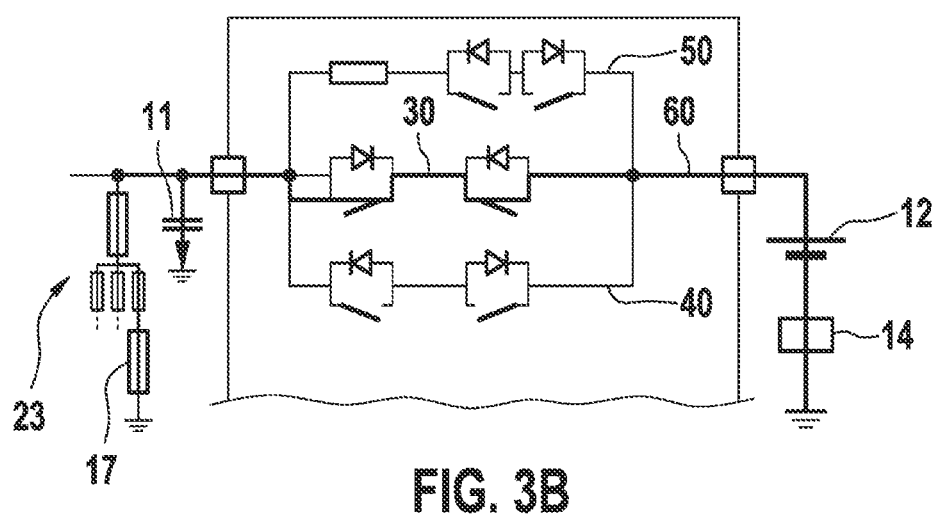

If the intermediate circuit capacitor 11 has been pre-charged (for example after 5 ms), the switching means 19 is activated so that at least one of the two main paths 30, 40 conducts the current 60 (FIG. 3B). The two main paths 30, 40 can also conduct the current 60. The on-board electrical system is now in the regular operating state and the two sub-on-board electrical systems (KL30_0 and KL30_1) are connected with low resistance. The additional path 50 can remain closed or open in this case.

Figure 3C:
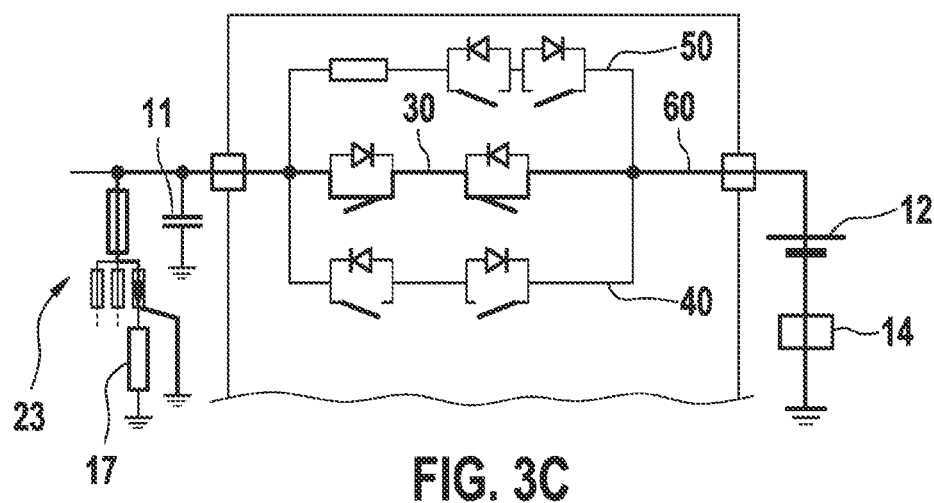

FIG. 3C shows the occurrence of a short circuit upstream of the load 17 with respect to ground as an exemplary fault. As a result, the on-board electrical system branch KL30_0 has a low resistance to ground and a rapid increase in current occurs through the switching means 19. The increase in current results in a drop in the on-board electrical system operating voltage of the two (low-resistance) coupled electrical system branches KL30_0 and KL30_1. The voltage on the safety-critical on-board electrical system side KL30_1 is permanently monitored by the power distributor 18 in order to guarantee a fault-free energy supply of the safety-critical loads 16, 25. If the voltage dip is too strong to guarantee fault-free operation, the two on-board electrical systems (sub-on-board electrical system at connection KL30_0 and sub-on-board electrical system at connection KL30_1) are isolated according to the sequence in FIGS. 3D and 3E. In addition to the evaluation of the voltage level, an evaluation of the duration is also carried out, since strong voltage drops are non-critical for short time durations and are only safety-critical from a certain period of time onward. In addition to the voltage drop, it can additionally be checked by evaluation of the current direction whether current from the safety-critical on-board network KL30_1 flows into the basic on-board electrical system KL30_0. Only when this current direction occurs (that is to say, no support of the safety-relevant load 16, 25 or the safety-relevant sub-on-board electrical system by the non-safety-relevant partial sub-on-board electrical system) does the switching means 19 open. If the current value exceeds the threshold value for disconnection (for example 500 A per path 30, 40), isolation of the two on-board electrical systems according to FIGS. 3D and 3E is carried out in order to prevent operation of the switching means 19 outside the relevant specification.

Figure 3D:
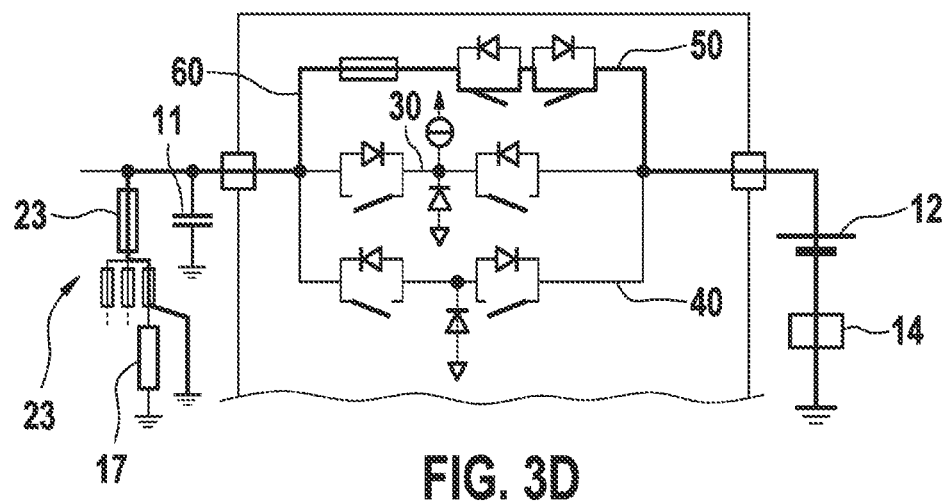

In FIG. 3D, the isolation process of the two sub-on-board electrical systems (KL30_0 and KL30_1) is started by opening the switching means 34, 36, 44, 46. The current 60 now flows via the additional path 50. The additional path 50 is closed. The current limitation takes place via the additional path 50 using the resistor 58. The brief high currents can be buffered during commutation via the corresponding RC elements (cf. FIG. 2, capacitors 61, 63, 67, 69, resistors 65, 71).

It is preferably provided that the current flows over the additional path 50 only for a limited period of time, in particular in order to prevent overload states. For example, a fixed period of time could be provided (for example in the ms range, for example for 1 ms) for which the additional path 50 is closed. For this purpose, a timer could be started, for example with the opening of the main paths 30, 40, with the additional path 50 being reopened once the timer has elapsed. Alternative embodiments are possible. For example, the additional path 50 could be disconnected depending on certain characteristic variables, for example when a certain limit value for current or temperature or the like is exceeded.

Figure 3E:
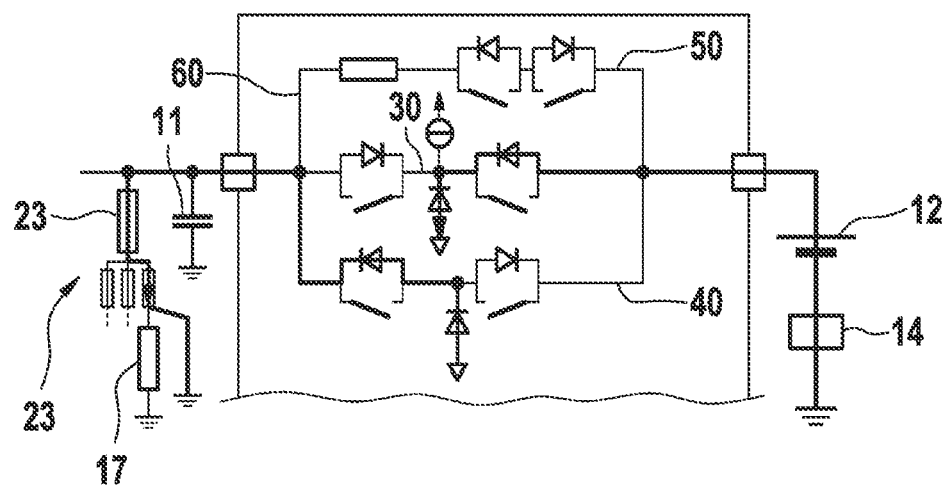

FIG. 3E shows how the additional path 50 is opened. The sub-path 52, however, is still closed or active. For this purpose, for example, the limiting means 55, 56 (for example diodes, particularly preferably TVS diodes) are provided in order to absorb the switching energy or to protect the switching means 34, 36, 44, 46, in particular MOSFETs, from the avalanche operation (FIG. 3E). In addition to the sub-path 52 (as part of the circuit for the switching means 19), this could also be performed via, for example, an external circuit in conjunction with the main paths 30, 40.

In the described procedure for burning through the fuse 23, the current level that is established is limited by the impedance of the short circuit. The switching means 34, 36, 44, 46 in the main paths 30, 40 must be able to store the peak losses or to have a better thermal resistance than the fuse 23. The energy for melting the fuse 23 is provided by the energy store 12 via the cold start path. The DC-DC converter 22 may optionally provide support.

Furthermore, the switching means 19 can be designed such that, in the context of an availability-optimized design, the burning-through of the fuses 23 at the connection KL30_0 is possible with only a single main path 30, 40 (supply redundancy).

The stepped disconnection described in FIG. 3 prevents oscillations and conducts switching losses via robust metal resistors 58, for example.

Short circuits having too low an impedance cannot be triggered. It is ensured that the burning-through of a fuse 23 for protection against thermal events can always be stopped. The current flow always remains within the design limits. Furthermore, the switching means 19 is designed such that it can carry the short-circuit current until the fuse 23 has burned through or an undervoltage occurs.

Figure 4:
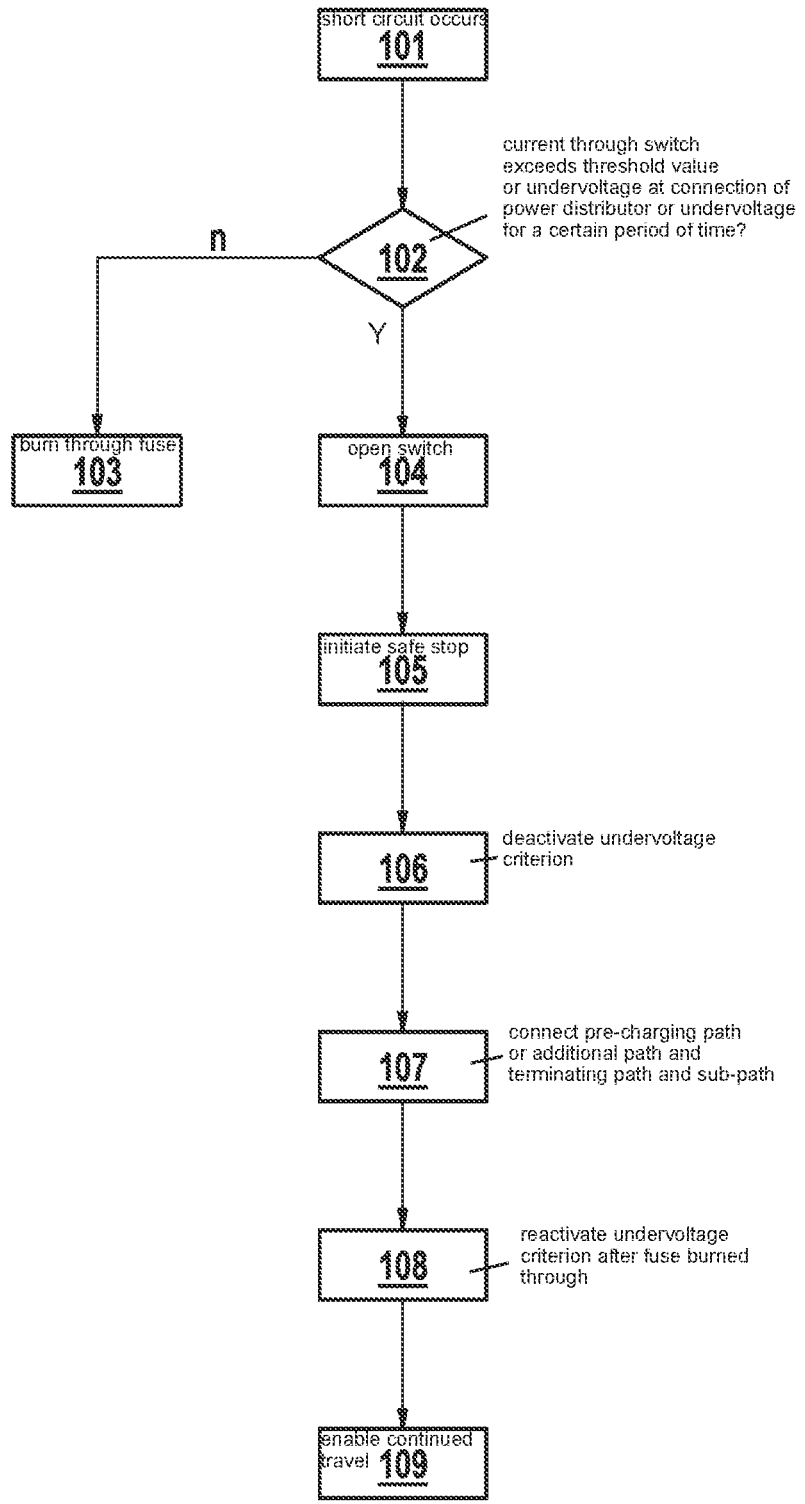
FIG. 4 shows a flow chart for the burning-through of the fuse, according to an example embodiment of the present invention.

For example, a flow chart is explained in FIG. 4 for this purpose. In step 101, a short circuit of the load 17 occurs, which load is connected to the connection KL30_0 of the power distributor 18 or in the sub-on-board electrical system for non-safety-relevant loads 17.

In the branch 102, it is distinguished whether the current through the switching means 19 exceeds a threshold value (for example 900 . . . 1000 A) or whether there is an undervoltage of the voltage at the connection KL30_1 of the power distributor 18 (for example U_30_1<9.6 V) or whether there is such an undervoltage for a certain period of time. If none of the conditions are met, this is followed by step 103, or otherwise by step 104.

In step 103, the fuse 23 is burned through at the connection KL30_0 of the power distributor 18 during driving operation. This is done by suitable activation of the switching means 19.

If a safety-critical operating situation has been detected in query 102, the switching means 19 is first opened in step 104. On the one hand, the switching means 19 is thus protected. On the other hand, it is ensured that the short circuit of the load 17 does not further lead to an undervoltage for the safety-relevant loads 16.

After a fault has been detected (in step 102), a safe stopping of the vehicle is initiated in step 105. As soon as the vehicle is at a standstill, step 106 follows.

In step 106, the undervoltage criterion (as described by way of example in step 102) is deactivated.

In step 107, the pre-charging path or additional path 50 and the terminating path or sub-path 52 are connected. The switching means 19 is also switched on. As a result of this step, a first current flows into the short circuit and reduces the voltage level in the safety-relevant on-board electrical system branch KL30_1. For safe burning-through of the fuse 23, the current paths 30 and 40 are additionally both (but at least one) closed. Due to the now low-resistance connection, the fuse 23 is quickly burned through. The overcurrent threshold for protecting the switching means 19 remains active in this time in order to be able to cancel the burning-through process at any time without exceeding the design limits. Thermal monitoring within the electrical power distributor 18 also remains active to protect the component.

After the fuse 23 has been burned through, the undervoltage criterion is reactivated; step 108.

Continued travel is enabled; step 109.

The switching means 19 is suitable for securing in particular safety-relevant loads 16, 25 in a motor vehicle, in particular in conjunction with a power distributor 18 which has a microcontroller 13 for selective evaluation of specific characteristic variables. This microcontroller 13 can now likewise be used by the corresponding evaluation of the characteristic variables of the detection means 38, 39, 48, 49 and corresponding control of the switching means 34, 36, 44, 46. The use, however, is not limited thereto.

What is claimed is:

1. A method for securing safety-relevant loads in a motor vehicle, including at least one main path which is arranged between a sub-on-board electrical system for at least one safety-relevant load of the motor vehicle and another sub-on-board electrical system for at least one non-safety-relevant load, the sub-on-board electrical system for the safety-relevant load being supplied with power by an energy store, the main path including at least one switch, the main path further including at least one detector configured to detect a current flowing through the main path, at least one additional path being provided which is connected in parallel with the main path, and the additional path having at least one switch, the method comprising the following steps:

opening the main path upon detection of a critical state, the critical state including: (i) an overcurrent and/or (ii) an undervoltage or overvoltage, on the sub-on-board electrical system for the safety-relevant load, the additional path being closed or kept closed while the main path is open; and subsequently reopening the additional path, wherein, when the critical state is detected, a countermeasure is initiated.

2. The method according to claim 1, wherein the additional path is reopened after a predeterminable period of time.

3. The method according to claim 2, wherein the predeterminable period of time is in a range of from 0.1 ms to 10 ms.

4. The method according to claim 1, wherein a timer is started with the opening of the main path, while the additional path is closed or remains closed, and the additional path is opened when the timer has elapsed.

5. The method according to claim 1, wherein the additional path is used for current limitation and/or for absorbing energy during a switching process of the main path, using at least one resistor arranged in the additional path.

6. The method as recited in claim 5, wherein the resistor is a metal resistor.

7. The method according to claim 1, wherein a voltage limitation is activated or remains activated while the main path and/or additional path is open.

8. The method according to claim 1, wherein a TVS diode is activated or remains activated while the main path and/or additional path is open.

9. The method according to claim 1, wherein the additional path remains closed until current through the switch of the main path has subsided exponentially and/or has subsided to a certain threshold value.

10. The method according to claim 1, wherein: (i) an undervoltage criterion is deactivated and/or (ii) an overcurrent threshold and/or thermal monitoring is activated or remains activated.

11. The method according to claim 1, wherein continued travel is subsequently enabled.

12. The method according to claim 1, wherein at least one capacitor and at least one resistor are connected in parallel with the switch of the main path as a commutation aid for the switch of the main path.

13. A method for securing safety-relevant loads in a motor vehicle, including at least one main path which is arranged between a sub-on-board electrical system for at least one safety-relevant load of the motor vehicle and another sub-on-board electrical system for at least one non-safety-relevant load, the sub-on-board electrical system for the safety-relevant load being supplied with power by an energy store, the main path including at least one switch, the main path further including at least one detector configured to detect a current flowing through the main path, at least one additional path being provided which is connected in parallel with the main path, and the additional path having at least one switch, the method comprising the following steps:
  opening the main path upon detection of a critical state, the critical state including: (i) an overcurrent and/or (ii) an undervoltage or overvoltage, on the sub-on-board electrical system for the safety-relevant load, the additional path being closed or kept closed while the main path is open; and
  subsequently reopening the additional path,
    wherein, when the critical state is detected, a countermeasure is initiated and/or the main path is closed or remains closed until a fuse that secures the non-safety-relevant load has burned through.

14. The method according to claim 13, wherein the countermeasure is a safe stopping of the motor vehicle.

15. The method according to claim 13, wherein the main path and/or the additional path is closed after deactivation of an undervoltage criterion.

16. The method according to claim 15, wherein after the fuse has been burned through, the undervoltage criterion is reactivated again.

17. A method for securing safety-relevant loads in a motor vehicle, including at least one main path which is arranged between a sub-on-board electrical system for at least one safety-relevant load of the motor vehicle and another sub-on-board electrical system for at least one non-safety-relevant load, the sub-on-board electrical system for the safety-relevant load being supplied with power by an energy store, the main path including at least one switch, the main path further including at least one detector configured to detect a current flowing through the main path, at least one additional path being provided which is connected in parallel with the main path, and the additional path having at least one switch, the method comprising the following steps:
  opening the main path upon detection of a critical state, the critical state including: (i) an overcurrent and/or (ii) an undervoltage or overvoltage, on the sub-on-board electrical system for the safety-relevant load, the additional path being closed or kept closed while the main path is open; and
  subsequently reopening the additional path,
    wherein a closing of the main path for a burning-through of a fuse that secures the non-safety-relevant load takes place during a driving operation of the motor vehicle, when no critical state has been detected.

18. A method for securing safety-relevant loads in a motor vehicle, including at least one main path which is arranged between a sub-on-board electrical system for at least one safety-relevant load of the motor vehicle and another sub-on-board electrical system for at least one non-safety-relevant load, the sub-on-board electrical system for the safety-relevant load being supplied with power by an energy store, the main path including at least one switch, the main path further including at least one detector configured to detect a current flowing through the main path, at least one additional path being provided which is connected in parallel with the main path, and the additional path having at least one switch, the method comprising the following steps:
  opening the main path upon detection of a critical state, the critical state including: (i) an overcurrent and/or (ii) an undervoltage or overvoltage, on the sub-on-board electrical system for the safety-relevant load, the additional path being closed or kept closed while the main path is open; and
  subsequently reopening the additional path,
    wherein the additional path for charging an intermediate circuit capacitor is closed during an initial start-up of the motor vehicle, and/or after a certain period of time after the charging of the intermediate circuit capacitor, the main path is closed.

19. A method for securing safety-relevant loads in a motor vehicle, including at least one main path which is arranged between a sub-on-board electrical system for at least one safety-relevant load of the motor vehicle and another sub-on-board electrical system for at least one non-safety-relevant load, the sub-on-board electrical system for the safety-relevant load being supplied with power by an energy store, the main path including at least one switch, the main path further including at least one detector configured to detect a current flowing through the main path, at least one additional path being provided which is connected in parallel with the main path, and the additional path having at least one switch, the method comprising the following steps:
  opening the main path upon detection of a critical state, the critical state including: (i) an overcurrent and/or (ii) an undervoltage or overvoltage, on the sub-on-board electrical system for the safety-relevant load, the additional path being closed or kept closed while the main path is open; and
  subsequently reopening the additional path, wherein an evaluation of a direction of current flowing between the two sub-on-board electrical systems is carried out and/or the main path in an undervoltage critical state is opened only when a current from the sub-on-board electrical system having the safety-relevant load flows into the further sub-on-board electrical system having the non-safety-relevant load.

* * * * *